No. 854,589. PATENTED MAY 21, 1907.
T. W. MITCHELL.
CONICAL RING ROD PACKING.
APPLICATION FILED JUNE 13, 1906.
2 SHEETS—SHEET 1.
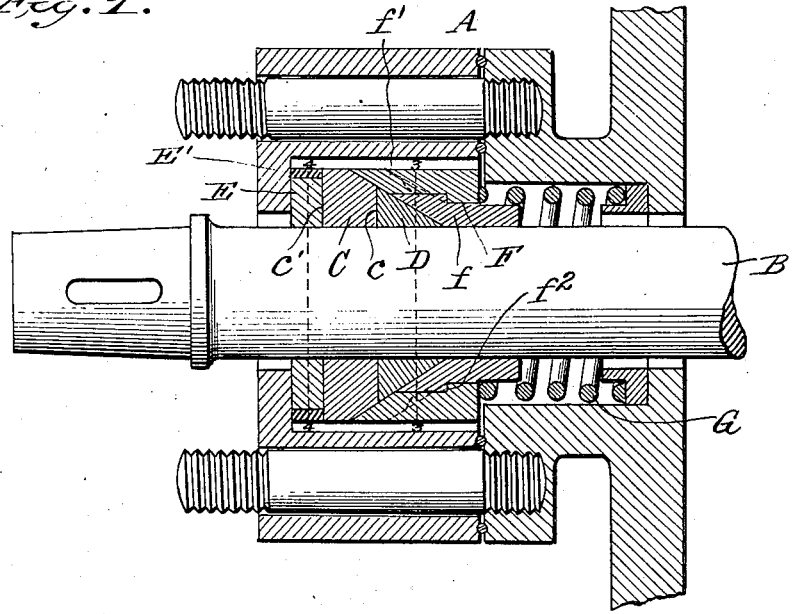
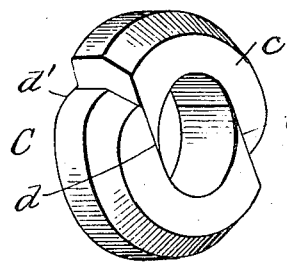
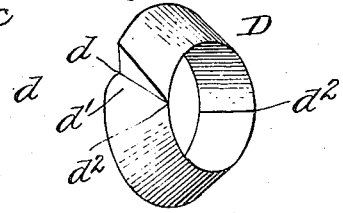
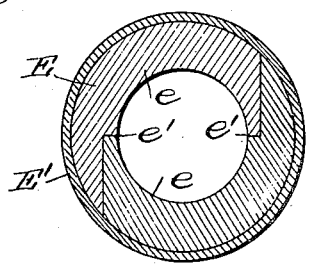
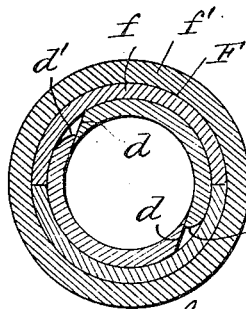
Witnesses
Edwin L. Yewell
Thomas Duant
Inventor
Thomas W. Mitchell,
By Church & Church
his Attorneys

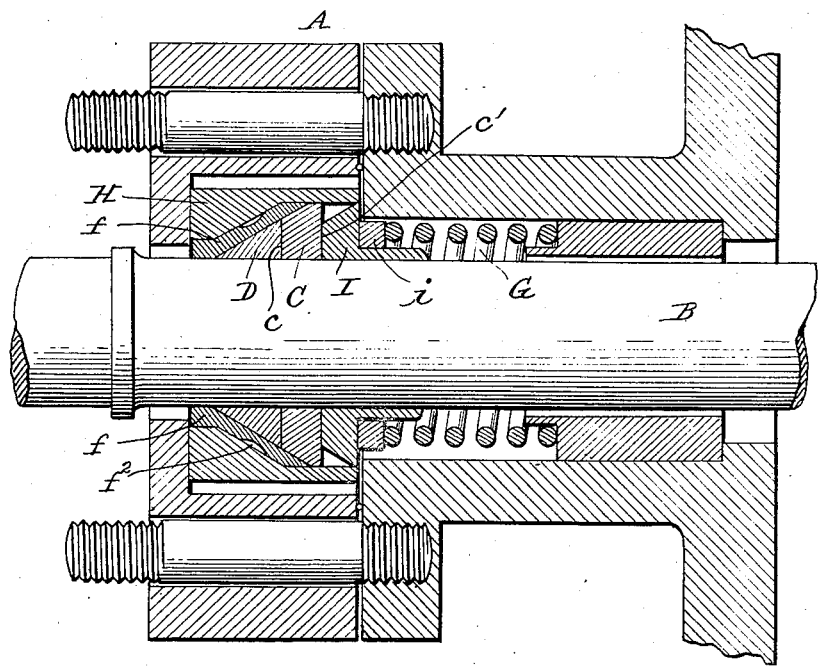
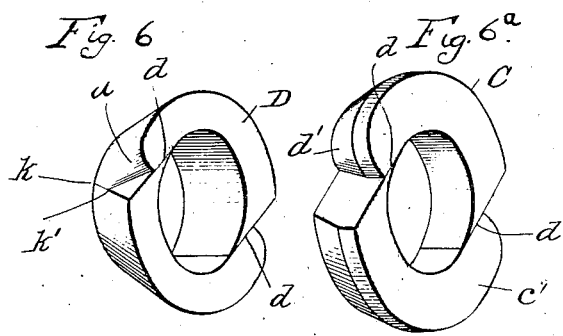
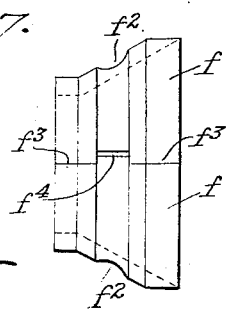

UNITED STATES PATENT OFFICE.

THOMAS W. MITCHELL, OF CHICAGO, ILLINOIS.

CONICAL-RING ROD-PACKING.

No. 854,589.  Specification of Letters Patent.  Patented May 21, 1907.

Application filed June 13, 1906. Serial No. 321,514.

*To all whom it may concern:*

Be it known that I, THOMAS W. MITCHELL, a citizen of the United States, residing at Chicago, in the county of Cook and State of Illinois, have invented certain new and useful Improvements in Conical-Ring Rod-Packing; and I do hereby declare the following to be a full, clear, and exact description of the same, reference being had to the accompanying drawings, forming a part of this specification, and to the figures and letters of reference marked thereon.

This invention relates to piston or other rod packings such as are designed to form steam or gas tight joints around rods which are movable with relation to their stuffing boxes and glands.

The objects of the invention are to reduce the number of separate parts, eliminate supplemental springs, and to provide a highly efficient packing which will automatically adjust itself both for wear and to accommodate transverse movement of the rod due either to inaccuracy of alinement or to uneven wear of the rod itself.

In the accompanying drawings—Figure 1 is a section through a stuffing box, gland and packing embodying the present improvements. Figs. 2 and 2ª are perspective views of the separated packing rings. Fig. 3 is a section on the line 3—3 Fig. 1.. Fig. 4 is a section on the line 4—4 Fig. 1. Fig. 5 is a section similar to Fig. 1 but with a modified arrangement of the packing. Figs. 6 and 6ª are perspective views of the packing rings preferably made use of in the arrangement shown in Fig. 5. Fig. 7 is a side elevation of the conically recessed cup shown in section in Fig. 5.

Similar letters of reference in the several figures indicate like parts.

The stuffing box and gland A shown in the accompanying drawings may be of any usual or preferred type adapted to receive a metallic packing, and as usual, said parts are adapted for the passage of a piston rod B.

To meet modern requirements a packing to be commercially successful must be adapted for coöperation with the reinforced type of piston rods (*i. e.* rods having a reinforced cross head fit) and the wearing parts must be capable of renewal or application without disconnecting the rods or other working parts of the engine.

In the present invention, the packing rings proper are sectional and of conical or frusto conical exterior formation. The rings, two in number in the structure shown, are lettered C and D, the ring C being the larger of the two and having flat faces against one of which $c$ the ring D seats and the other $c'$ of which seats against the joint ring E.

To press the sections of the rings inwardly a cone cup F is provided and a spring G assisted by steam pressure serves to move the cone cup over the rings. Ordinarily conical packing rings are made segmental and clearance for wear is provided between the proximate faces of the segments; in accordance with the present invention, however, the sections are not separated on radial nor on spiral lines but in planes tangential or substantially tangential to the inner circumference of the rings as indicated at $d$, the end faces contact and clearance is provided by cutting away or curving the overlapping end of each section sharply inward as indicated at $d'$. Sufficient overlapping of the ends of the sections is provided to insure a steam tight joint between the sections of each ring, although in the smaller of the rings the overlapping portion usually tapers down to practically nothing at the edge as indicated at $d^2$ in Fig. 2ª. Obviously, as wear takes place the cone cup will advance and the sections of the ring will be caused to approach each other by reason of the coöperation of the conical surfaces, but at no time will any opening for the passage of steam be formed between the sections of the rings nor between the rings themselves, nor between the rings and rod.

In the arrangement shown in Fig. 1 the cone cup follows the rings and consequently it is not necessary that steam tight joints shall exist between the exterior of the rings and the cup but in the arrangement shown in Fig. 5 the cup indicated by the letter H rests against the gland and the rings are pushed into it by a sectional follower I and ring $i$ against which the spring exerts its pressure, and in this form provision is made for a steam tight joint between the rings, or one of the rings, and the cup. This is accomplished by forming the ring so that the outer conical or tapering surfaces at the ends of the sections will meet or register for a short distance from the thin edge of the ring for instance from the point $k$ to $k'$ in Fig. 6. At the point $k$ the two sections need not lap at all, while at $k'$ the lap may be considerable ($\frac{3}{16}$ of an inch or more) and equal to the lap of the sections throughout the other portion of that ring as well as the other ring or rings.

By making the lap uniform from the point $k'$ throughout the rings to the rear, new rings may be successively placed in position at the rear as the forward rings wear and the rings may be continued in service until completely worn away.

While the packing rings described may be readily placed in position on a reinforced type of piston rod, it is desirable that both the cone cup and the joint ring shall have the same capacity and hence each of these parts is made in part sectional and the sections are held in relative position by annular inclosures. The central part $f$ of the cone cup is sectional and the outer part $f'$ annular, the two parts being accurately fitted together and a shoulder $f^2$ (in the form shown in Fig. 1) provided for preventing rearward movement of the sectional part.

The preferred form of cone cup is shown in Figs. 5 and 7, the sectional part being made in halves $f$ forming a bushing. The outer conical face of the bushing is provided with an annular groove or recess $f^2$ to reduce the width of the bearing surface on the outside and the meeting ends of the halves are provided with projections $f^3$ and tongues $f^4$ fitting snugly between the projections $f^3$. The tongues $f^4$ are of less length than the depth of their recesses and while the projections $f^3$ will wear or chafe under rod vibration steam tight joints at the ends of $f^3$ will be maintained as the bushing will advance into the outer cup as rapidly as wear takes place. Obviously this form of conical bushing may be employed in the construction shown in Fig. 1 as indicated by the dotted lines in said figure.

The inner part of the joint ring E is also made sectional the joints between the sections $e$ being preferably tangential save for short radial parts $e'$ near the inner periphery and the sections are driven into a steel ring E' so as to form smooth faces and steam tight joints between the sections.

The packing described is compact composed of few parts each of simple construction and of such character as to be easily and quickly placed in position even by unskilled labor. The steam pressure assists in holding the rings up to their work and at the same time there is no wedging of the packings into the cone cup upon the return stroke of the piston following exhaust. As wear takes place the cone cup is forced over the rings causing the sections to move on their tangential faces toward the rod and the ends of the sections will be caused to approach by bending or shortening the outer radius to give a uniform pressure on all sides of the rod.

Each section of the packing rings it will be noted has two end faces parallel with each other, both faces in the same direction and the sections are reversed with relation to each other in assembling, whereby the inner plane face on one section bears against the outer plane face on the opposite section.

What I claim as my invention and desire to secure by Letters Patent, is:—

1. The herein described frusto conical rod packing ring for rod packing, formed in co-operating separate sections having overlapping ends with contacting faces, each of said faces lying in a plane tangential to the inner periphery of the ring.

2. In a rod packing, the combination with the cup having a conical recess therein, of the frusto conical packing rings fitting in said recess and formed in sections having overlapping ends with contacting faces lying in planes tangential to the inner periphery of the rings, the outer overlapping ends being cut away to afford clearance and permit of relative movement of the sections toward each other.

3. In a rod packing, the combination with the cup having a conical recess therein, of the frusto conical packing rings fitting in said recess and formed in sections the opposite ends of each section being formed with parallel faces both facing in the same direction said sections being assembled in reversed relation and with the end faces in contact.

4. In a rod packing, the combination with the stuffing box and gland, of the spring pressed cup having a conical recess therein, the frusto conical packing rings located in said recess and formed in sections with overlapping contacting end faces lying in planes tangential to the interior periphery of the rings and a joint ring against which the packing rings are seated by the pressure on the cup cone; substantially as described.

5. In a rod packing, the combination with the stuffing box and gland, of the spring pressed cup having a conical recess therein, and formed of an annular outer part and a sectional inner part, the frusto conical packing rings located in said recess and formed in sections, and a ring located on the opposite side of the packing rings from the cone cup; substantially as described.

6. In a rod packing, the combination with the cone cup formed of an annular outer part conical on the inside and a sectional conical bushing therein forming a conical recess, of the frusto conical packing rings located in said recess and formed in sections having contacting overlapping end faces; substantially as described.

7. In a rod packing, the combination with the cone cup formed of an annular outer part conical on the inside and a sectional inner part conical on both inner and outer sides and with interlocking ends of the sectional frusto-conical packing rings located in the cone cup and formed in sections having contacting overlapping end faces; substantially as described.

THOMAS W. MITCHELL.

Witnesses:
   GUY M. MILLER,
   P. R. C. ENGE.